No. 718,902. PATENTED JAN. 20, 1903.
I. G. BERRY.
CORN HUSKER AND FODDER SHREDDER.
APPLICATION FILED MAY 13, 1901.
NO MODEL.

Witnesses: Inventor
Ira G. Berry
By Rector & Hibben
Att'ys

UNITED STATES PATENT OFFICE.

IRA G. BERRY, OF STERLING, ILLINOIS, ASSIGNOR, BY MESNE ASSIGNMENTS, TO THOMAS A. GALT, OF STERLING, ILLINOIS.

CORN-HUSKER AND FODDER-SHREDDER.

SPECIFICATION forming part of Letters Patent No. 718,902, dated January 20, 1903.

Application filed May 13, 1901. Serial No. 59,992. (No model.)

*To all whom it may concern:*

Be it known that I, IRA G. BERRY, a citizen of the United States, residing at Sterling, in the county of Whiteside, in the State of Illinois, have invented a certain new and useful Improvement in Corn-Huskers and Fodder-Shredders, of which the following is a description, reference being had to the accompanying drawings, forming part of this specification.

My invention relates to machines of familiar type for husking corn and shredding corn-fodder, and has for its principal object the provision of improved means for carrying the husks and shredded fodder to the rear of the machine and delivering them to the discharge devices there located. Its novelty will be hereinafter more fully set forth, and particularly pointed out in the claims.

Figure 1:
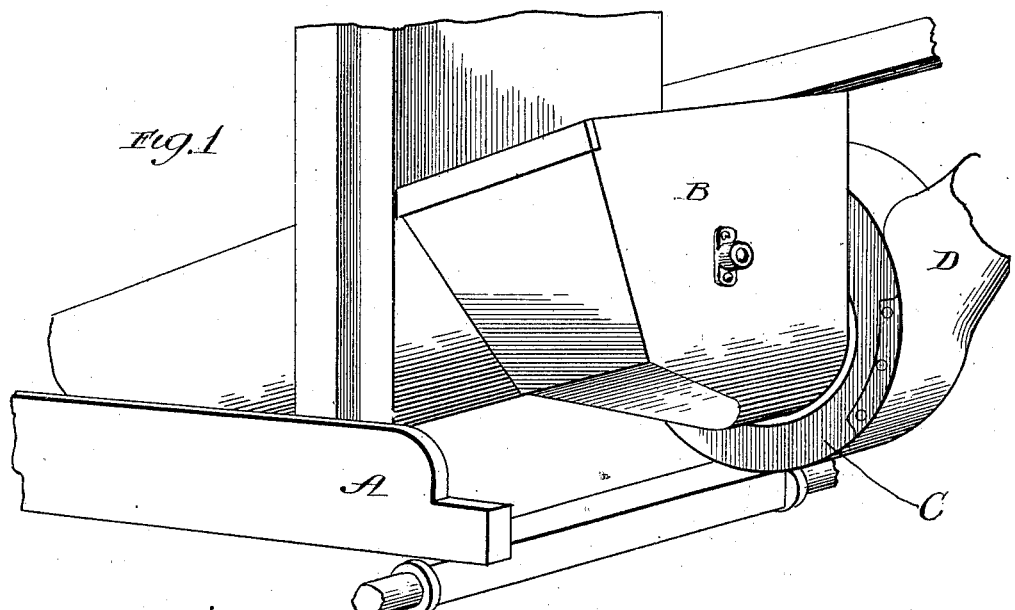
Figure 2:
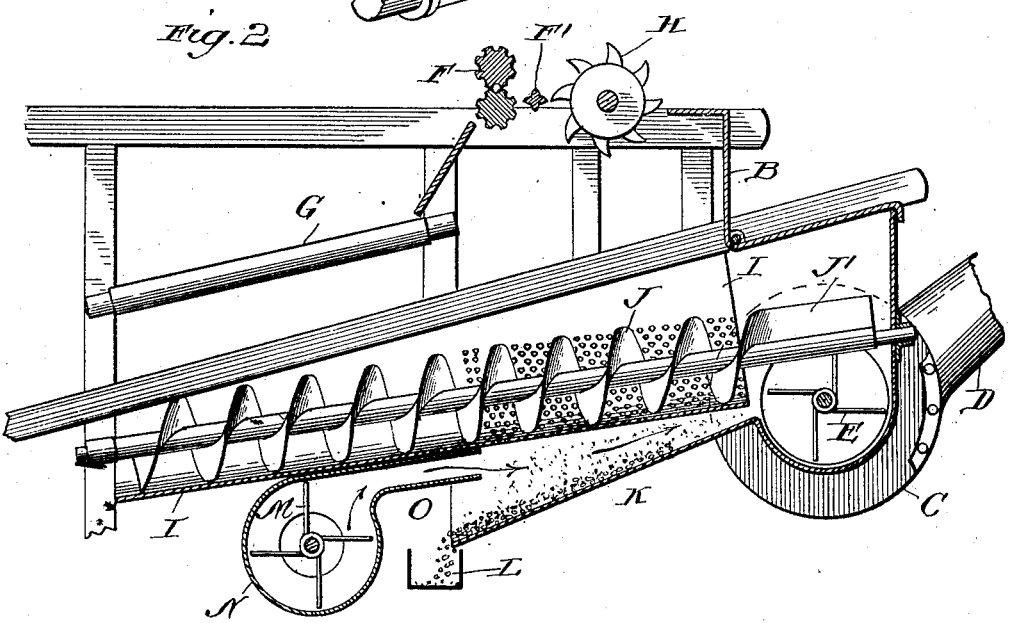

In the accompanying drawings, Figure 1 is a perspective view of the rear end of a machine embodying my invention; Fig. 2, a middle vertical section of the same, and Fig. 3 a cross-sectional detail showing a double trough and a pair of spiral conveyers instead of a single trough and conveyer.

The same letters of reference are used to indicate corresponding parts in the several views.

A represents the framework of the machine, having the closed rear end B, at whose left side is located the fan-casing C, having secured to it the discharge-spout D and containing the rotary fan E, by means of which a suction from the delivery end of the machine and a blast through the discharge-spout are produced to effect the discharge of the husks and shredded fodder through the fan-casing and discharge-spout, as usual.

F represents the snapper-rolls by which the ears of corn are snapped from the stalks as the latter are fed between the rolls and from whence the ears drop upon the usual husking-rolls G, while the stalks are fed onward over the rotary cutter-bar F' to the shredder-head H, by which they are cut longitudinally into shreds and delivered downward into the machine, all as common to this class of machines.

Heretofore the husks and shredded fodder have dropped from the husking and shredding devices upon an endless traveling apron moving rearwardly and by which they were carried to the rear end of the machine and delivered to discharge devices. My present invention has for its object the provision of more efficient and satisfactory devices for thus carrying the husks and shredded fodder to the rear end of the machine and delivering them to the discharge devices, and consists in the employment in place of the traveling apron of a suitable trough located beneath the shredding and husking devices and leading to the rear end of the machine into position to discharge its contents into the open side of the fan-casing, and the combination, with such trough, of a spiral conveyer whose rear end preferably projects beyond the trough and has its spiral blade straightened into approximate alinement with the axis of the conveyer and operating to positively throw the husks and fodder as they are delivered from the rear end of the trough by the spiral portion of the conveyer into the open mouth of the fan-casing.

I represents the trough referred to, suitably secured to the framework beneath the shredder-head H and husking-rolls G and having its sides flared outwardly sufficiently to readily catch the shredded fodder and the husks as they drop from the shredder-head and husking-rolls. The lower part of the trough is suitably rounded to fit the spiral conveyer J, which coöperates with it, and in the present instance the spiral blade of the conveyer is shown straightened out in rear of the trough to form a flat blade J' substantially parallel with the axis or shaft of the conveyer, which blade J', turning in the direction indicated by the arrows, strikes the shredded fodder and husks as they are delivered from the rear end of the trough I and throws them toward the left side of the machine into the open mouth of the fan-casing C, whence they are delivered by the blast of air produced by the fan into and through the discharge-spout D. The right side of the closed rear end B of the machine is curved inward toward the fan-casing, so that the blade J' sweeping downward adjacent the inner surface thereof will direct all of the husks and fodder into the fan-casing and prevent any portion thereof lodging in the machine.

The trough I may be made of sheet metal and is shown provided in its rear portion with perforations of sufficient size to readily permit the passage of loose grains of corn. As the ears of corn are snapped from the stalks by the snapper-rolls F a considerable number of grains of corn are loosened from the butts of the ears and pass between the rolls with the stalks and drop with the shredded fodder into the trough I. Likewise the husking-rolls G in tearing the husks from ears of corn loosen some of the grains, which drop with the husks into the portion of the trough beneath said rolls and are carried rearward through the trough by the conveyer. The perforations in the rear portion of the trough permit these loose grains to escape through the bottom of the trough and drop onto an inclined delivery-board K, by which they may be delivered to any suitable receptacle L or to a carrier, by which they may be carried to any other desired point or receptacle. For the purpose of cleaning this shelled corn as it passes from the trough I to the receptacle L, I provide a second rotary fan M, located in a casing N, having a discharge-spout O, projecting rearward from it and opening into a space beneath the trough I, so that as the shelled corn drops through said trough the dust and foreign matter accompanying it will be separated from it and carried rearward by the blast of air into the fan-casing C and out the discharge-spout D.

Figure 3:
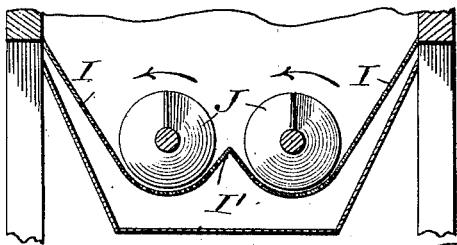

In the larger-sized and wider machines of this class a double trough I and pair of conveyers J may be employed to advantage, as shown in Fig. 3. Such double trough may be formed of sheet metal by simply bending up the bottom of a wide trough along its longitudinal middle line, as at I' in Fig. 3, and even if the two portions of the double trough are formed separately their adjacent inner walls will be united at their upper edges, midway between the two conveyers, in a plane not above that of the axes of the conveyer, and the entire bottom of the trough transversely of the machine, including the angular portion projecting upward between the conveyers, will be perforated, as shown. This construction not only facilitates the action of the conveyers in advancing the husks and shredded fodder along the trough, but prevents the lodging of loose grains of corn in the trough and insures their escape through the perforations in the bottom thereof.

My improved devices, above described, for delivering the husks and shredded fodder to the discharge end of the machine are more efficient and positive in their action than those heretofore employed, while the provision of means for separating the shelled corn from the husks and fodder and cleansing it of dust and foreign matter after being separated enables a considerable quantity of shelled corn to be saved which has heretofore been discharged from the machine with the husks and fodder and to be delivered in clean condition into the receptacle provided for it.

Having thus fully described my invention, I claim—

1. In a corn-husking machine, the combination with the frame, of husking and shredding devices mounted therein, a trough beneath said husking and shredding devices, a housing arranged in rear of said trough and extending below the end thereof, a fan-casing arranged at one side of the housing having an inlet-opening communicating with the housing extending above and below the end of the trough, a fan in said casing, and a conveyer longitudinally traversing said trough and housing, said conveyer comprising a spiral, and a straight blade J' radially disposed relative to the axis of the spiral and forming a continuation thereof, said blade being disposed adjacent to the inlet of the fan-casing to feed material thereto, substantially as described.

2. In a corn-husking machine, the combination with the frame, of husking and shredding devices mounted therein, a trough beneath said husking and shredding devices, a housing at the rear of said trough, a fan-casing arranged adjacent to the housing having an inlet-opening communicating with the housing, a fan in said casing, and a spiral conveyer in said trough and housing having a blade J' forming a continuation of the spiral and being disposed adjacent to the inlet of the fan-casing to feed material thereto, substantially as described.

3. In a corn-husking machine, the combination with the frame, of husking and shredding devices mounted therein, a double trough beneath said husking and shredding devices, a housing arranged in rear of said trough and extending below the end thereof, a fan-casing arranged at one side of the housing having an inlet-opening communicating with the housing extending above and below the end of the trough, a fan in said casing, and conveyers longitudinally traversing both troughs and housing, each conveyer comprising a spiral and a straight blade J' radially disposed relative to the axis of the spiral and forming a continuation thereof, said blade being disposed adjacent to the inlet of the fan-casing to feed material thereto, the bottom of the housing at the rear of the trough being inclined downwardly toward the fan-casing, substantially as described.

4. In a machine of the character described, a trough having a portion of its bottom perforated, said trough being open at its rear end, a conveyer in said trough comprising a spiral and a straight blade J' radially disposed relative to the axis of the spiral and forming a continuation thereof, said blade J' extending beyond the open rear end of the trough, a fan-casing secured to the imperforate portion of the bottom of the trough and disposed to direct a blast of air beneath the perforated portion thereof, a fan in said casing, a shelf beneath the perforated portion of the trough, said shelf being inclined from a point adjacent to the rear end of the trough forwardly and downwardly in the direction of the fan, and means whereby the conveyer and the fan may be rotated, substantially as described.

5. In a machine of the character described, a trough having a portion of its bottom perforated, said trough being open at its rear end, a spiral conveyer, a fan-casing secured to the imperforate portion of the bottom of the trough and disposed to direct a blast of air beneath the perforated portion thereof, a fan in said casing, a shelf beneath the perforated portion of the trough, said shelf being inclined from a point adjacent to the rear end of the trough forwardly and downwardly in the direction of the fan, and means whereby the conveyer and the fan may be rotated, substantially as described.

IRA G. BERRY.

Witnesses:
E. L. GALT,
A. J. PLATT.